US011825057B2

(12) United States Patent
Kubo

(10) Patent No.: US 11,825,057 B2
(45) Date of Patent: Nov. 21, 2023

(54) IMAGE-PROCESSING APPARATUS, IMAGE-FORMING APPARATUS, METHOD OF PROCESSING IMAGE, AND STORAGE MEDIUM

(71) Applicant: CANON KABUSHIKI KAISHA, Tokyo (JP)

(72) Inventor: Hideki Kubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/959,535

(22) Filed: Oct. 4, 2022

(65) Prior Publication Data
US 2023/0023288 A1  Jan. 26, 2023

Related U.S. Application Data

(63) Continuation of application No. 16/897,345, filed on Jun. 10, 2020, now Pat. No. 11,496,648, which is a
(Continued)

(30) Foreign Application Priority Data

Dec. 19, 2017 (JP) ................................. 2017-242561
Sep. 11, 2018 (JP) ................................. 2018-169659

(51) Int. Cl.
*H04N 1/409* (2006.01)
*H04N 1/60* (2006.01)
*B41J 2/21* (2006.01)

(52) U.S. Cl.
CPC ......... *H04N 1/4092* (2013.01); *H04N 1/6097* (2013.01); *B41J 2/21* (2013.01)

(58) Field of Classification Search
CPC .... H04N 1/4092; H04N 1/6097; B41J 2/2054
See application file for complete search history.

(56) References Cited

U.S. PATENT DOCUMENTS 5,132,144 A * 7/1992 Parks ..................... C09D 11/02
426/243
5,313,232 A * 5/1994 Peer ....................... B41J 2/2107
347/88
(Continued)

FOREIGN PATENT DOCUMENTS

JP  2000-318140 A  11/2000
JP  2009-172970 A   8/2009
(Continued)

OTHER PUBLICATIONS

International Search Report dated Feb. 19, 2019, in International Patent Application No. PCT/JP2018/045280.

*Primary Examiner* — King Y Poon
*Assistant Examiner* — Michael L Burleson
(74) *Attorney, Agent, or Firm* — Venable LLP

(57) ABSTRACT

An apparatus for generating data includes one or more processors and one or more memories, the one or more memories including one or more programs. The one or more programs cause the one or more processors (a) to generate edge data for specifying an area that corresponds to an edge of a convex portion, based on data for specifying a position of the convex portion in unevenness, (b) to determine whether a height of the edge that the edge data represents is equal to or greater than a first threshold, and (c) to reduce a recording amount of a recording material for forming, on the recording medium, an area that corresponds to the edge the height of which is less than the first threshold.

21 Claims, 13 Drawing Sheets

Related U.S. Application Data continuation of application No. PCT/JP2018/045280, filed on Dec. 10, 2018.

(56) References Cited

U.S. PATENT DOCUMENTS

| | | | |
|---|---|---|---|
| 5,825,996 A | 10/1998 | Davis et al. | |
| 9,871,950 B2 | 1/2018 | Arai et al. | |
| 10,321,016 B2 | 6/2019 | Kubo | |
| 10,397,427 B2 | 8/2019 | Kubo et al. | |
| 11,496,648 B2* | 11/2022 | Kubo | H04N 1/6097 |
| 2002/0135800 A1* | 9/2002 | Dutta | G06F 3/1219 |
| | | | 358/1.15 |
| 2003/0179409 A1 | 9/2003 | Nishida | |
| 2005/0243334 A1* | 11/2005 | Sato | G06T 7/60 |
| | | | 358/1.3 |
| 2006/0109326 A1* | 5/2006 | Nakazawa | B41J 2/2114 |
| | | | 347/101 |
| 2006/0251436 A1 | 11/2006 | Winter et al. | |
| 2008/0101698 A1* | 5/2008 | Yago | G06V 30/412 |
| | | | 382/172 |
| 2008/0204538 A1 | 8/2008 | Kovacs et al. | |
| 2012/0268537 A1* | 10/2012 | Takahashi | H04N 1/54 |
| | | | 347/102 |
| 2012/0307271 A1* | 12/2012 | Ishitoya | B41M 5/00 |
| | | | 358/1.9 |
| 2014/0253621 A1* | 9/2014 | Sakurada | B41J 19/147 |
| | | | 347/15 |
| 2015/0041543 A1 | 2/2015 | Miyamoto | |
| 2016/0193823 A1* | 7/2016 | Klein Koerkamp | H04N 1/58 |
| | | | 101/481 |
| 2017/0120520 A1 | 5/2017 | Miller | |
| 2018/0345681 A1* | 12/2018 | Weijkamp | B41M 5/0047 |

FOREIGN PATENT DOCUMENTS

| | | |
|---|---|---|
| JP | 2012-059143 A | 3/2012 |
| JP | 2012-223997 A | 11/2012 |
| JP | 2014-117646 4 | 6/2014 |
| JP | 2016-074146 A | 5/2016 |
| JP | 2017-035876 A | 2/2017 |

\* cited by examiner m-TH MAIN SCANNING (m+1)-TH MAIN SCANNING (m+2)-TH MAIN SCANNING

IMAGE-PROCESSING APPARATUS, IMAGE-FORMING APPARATUS, METHOD OF PROCESSING IMAGE, AND STORAGE MEDIUM

CROSS-REFERENCE TO RELATED APPLICATIONS

This application is a continuation of U.S. patent application Ser. No. 16/897,345, filed Jun. 10, 2020, now U.S. Pat. No. 11,496,648, issued Nov. 8, 2022, which claims the benefit of International Patent Application No. PCT/JP2018/045280, filed Dec. 10, 2018, which claims the benefit of Japanese Patent Application No. 2017-242561, filed Dec. 19, 2017, and Japanese Patent Application No. 2018-169659, filed Sep. 11, 2018, both of which are hereby incorporated by reference herein in their entirety.

BACKGROUND OF THE INVENTION

Field of the Invention

The present invention relates to an image processing technique for forming unevenness on a recording medium.

Background Art

It is known that a stereoscopic effect is produced in a manner in which an image having unevenness is formed on a recording medium. In a method of forming the unevenness, ink is superimposed on the recording medium by using an ink-jet printer. Japanese Patent Laid-Open No. 2000-318140 discloses a method of producing the stereoscopic effect by superimposing ink on a recording medium by using an ink-jet printer.

In a case when unevenness is formed on the recording medium by superimposing the ink, there is a problem in that a large amount of the ink is consumed in proportion to the height of the unevenness to be reproduced.

The present invention has been accomplished in view of the above problem, and it is an object of the present invention to provide image processing for reducing the consumption of a recording material that is used to form unevenness on a recording medium.

SUMMARY OF THE INVENTION

To solve the above problem, an image-processing apparatus according to the present invention generates data to be outputted to formation is configured to form a shaped article on a recording medium. The image-processing apparatus includes an acquisition unit configured to acquire first shape data that represents a shape of unevenness, a first generation unit configured to generate edge data that represents a shape of an edge of the unevenness, based on the first shape data, and a second generation unit configured to generate first recording amount data that represents a recording amount of a first recording material that is used to form at least a part of the edge in the edge data on the recording medium, or first dot arrangement data that represents a dot arrangement of the first recording material on the recording medium, based on the edge data.

Further features of the present invention will become apparent from the following description of exemplary embodiments with reference to the attached drawings.

DESCRIPTION OF THE EMBODIMENTS

First Embodiment

Figure 1A:
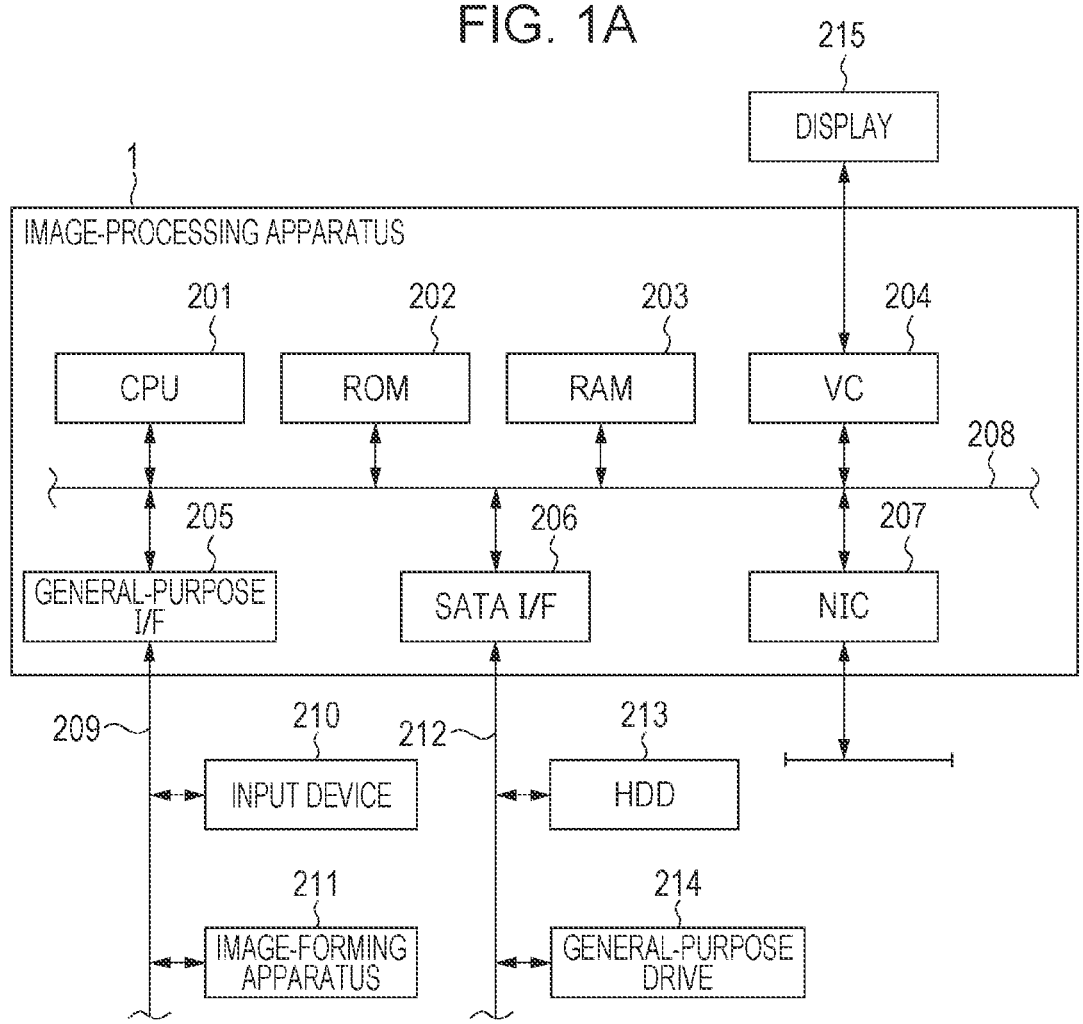
FIG. 1A illustrates the structure of an image-processing apparatus 1.

According to the present embodiment, data for forming a three-dimensionally shaped article is generated by stacking an image layer that represents color and an uneven layer having unevenness on a recording medium. The present embodiment will now be described with reference to the drawings. The embodiment below does not necessarily limit the present invention. All of the combinations of features described according to the present embodiment are not necessarily essential for solutions according to the present invention. Components similar to each other are designated by like reference characters.

<Reduction in Costs of Formation of Unevenness>

In a case when the unevenness is formed by superimposing ink on the recording medium, a large amount of the ink used to form the unevenness needs to be consumed in proportion to the height of the unevenness to be reproduced. In addition, a recording head of an image-forming apparatus needs to perform recording scanning multiple times, and the formation of the unevenness takes time.

In a case when a human being observes the unevenness, a local step in the unevenness and shade that is provided by the step greatly affect the recognition of the unevenness. For this reason, low-frequency unevenness that has a gentle slope is more unlikely to be recognized than high-frequency unevenness that has fine ups and downs. An edge portion of the low-frequency unevenness that has a gentle slope is greatly conducive to the recognition of the low-frequency unevenness. In view of this, according to the present embodiment, the gentle slope is not reproduced regarding a low frequency component of the unevenness to be reproduced, but the edge portion is reproduced on the recording medium. Consequently, a print on which a user recognizes the reproduced unevenness can be formed, and costs such as the consumption of the ink that is used to form the unevenness and the time required for forming the unevenness can be reduced.

Human beings can recognize a step having a size of about 20 μm or more as a three-dimensional shape. In many cases, unevenness having a size of less than 20 μm is perceived as the texture of a plane such as a sense of gloss or a sense of a mat instead of a three-dimensional shape. In view of this, according to the present embodiment, unevenness having a height of less than 20 μm in the unevenness to be reproduced is reproduced with the height thereof reduced. Consequently, the texture of an uneven surface is represented, and the print on which the user recognizes the reproduced unevenness can be formed. In addition, the costs such as the consumption of the ink that is used to form the unevenness and the time required for forming the unevenness can be reduced.

The ups and downs of an upper portion of the unevenness are greatly conducive to the recognition of the high-frequency unevenness that has the fine ups and downs. Accordingly, there is no large difference in a sense from a case when the depth (amplitude) of the unevenness is reduced. In view of this, according to the present embodiment, dense edges (high frequency component) in the unevenness to be reproduced are extracted, the extracted edges being formed on the recording medium with the amplitude reduced. Consequently, the print on which the user recognizes the reproduced unevenness can be formed, and the costs such as the consumption of the ink that is used to form the unevenness and the time required for forming the unevenness can be reduced.

<Hardware Configuration of Image-Processing Apparatus 1>

The hardware configuration of an image-processing apparatus 1 will be described with reference to FIG. 1A. The image-processing apparatus 1 is, for example, a computer and includes a CPU 201, a ROM 202, and a RAM 203. The image-processing apparatus 1 also includes a VC (video card) 204, a general-purpose I/F (interface) 205, a SATA (serial ATA) I/F 206, and a NIC (network interface card) 207. The CPU 201 uses the RAM 203 as a work memory to execute an OS (operating system) and various programs that are stored in, for example, the ROM 202 or a HDD (hard disk drive) 213. The CPU 201 controls components by using a system bus 208. Processes in a flowchart described later are performed in a manner in which a program code that is stored in, for example, the ROM 202 or the HDD 213 is loaded into the RAM 203 and executed by the CPU 201. A display 215 is connected to the VC 204. An input device 210 such as a mouse or a keyboard and an image-forming apparatus 211 are connected to the general-purpose I/F 205 with a serial bus 209 interposed therebetween. The HDD 213 and a general-purpose drive 214 for writing to or reading from various recording media are connected to the SATA I/F 206 with a serial bus 212 interposed therebetween. The NIC 207 is used for input and output of information with an external device. The CPU 201 uses various recording media that are mounted on the HDD 213 and the general-purpose drive 214 as storages for various kinds of data. The CPU 201 causes the display 215 to display a UI (user interface) that is provided by a program and receives an input such as a user instruction that is received by using the input device 210.

<Logical Configuration of Image-Processing Apparatus 1>

Figure 1B:
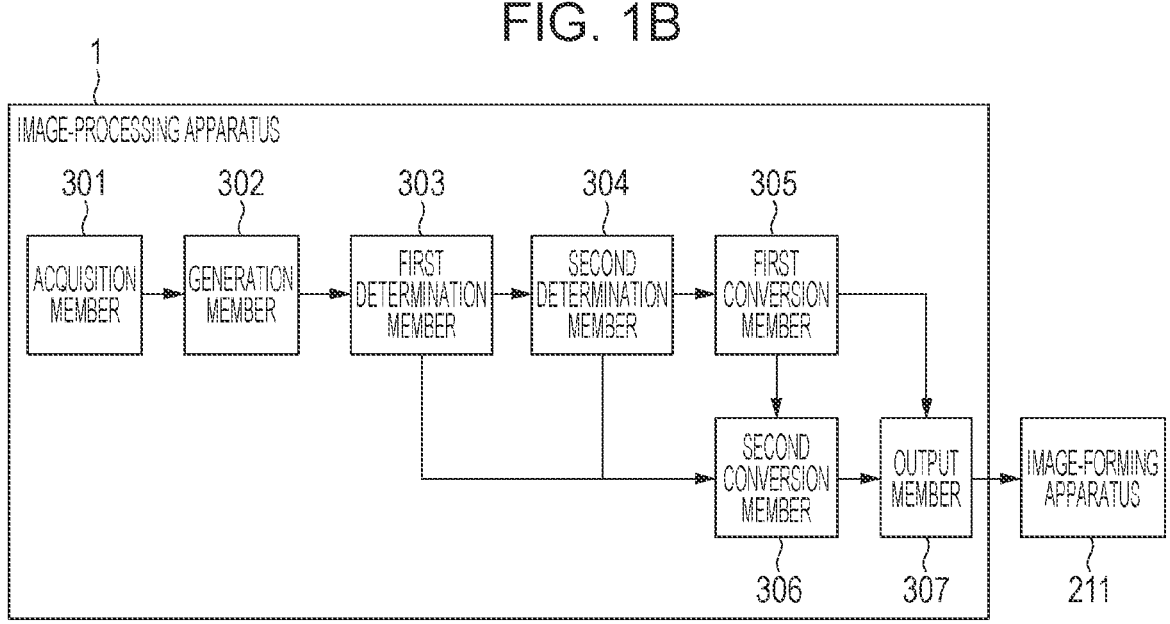
FIG. 1B illustrates the structure of the image-processing apparatus 1.

FIG. 1B illustrates the logical configuration of the image-processing apparatus 1. The image-processing apparatus 1 includes an acquisition member 301, a generation member 302, a first determination member 303, a second determination member 304, a first conversion member 305, a second conversion member 306, and an output member 307.

The acquisition member 301 acquires color data that represents the color of the image layer and shape data that represents the height of a surface of the uneven layer from a reference surface. The generation member 302 generates edge data that represents the height of an edge of the unevenness by detecting an edge in the shape data. The first determination member 303 determines whether the edge that the edge data represents has a height equal to or more than a threshold and generates flag data that represents whether the edge is to be accurately reproduced, based on the result of the determination. The second determination member 304 calculates edge density, based on the edge data and updates the flag data, based on the calculated density. The first conversion member 305 converts a pixel value of the edge data corresponding to the edge to be accurately reproduced, based on the flag data and the edge data. The second conversion member 306 converts a pixel value of the edge data corresponding to the edge to be reproduced with the height thereof reduced, based on the flag data and the edge data. The output member 307 generates dot arrangement data that represents dot arrangement of the ink that is applied to the recording medium, based on the color data and output shape data that is acquired by converting the pixel value of the edge data and outputs the generated dot arrangement data to the image-forming apparatus 211.

<Structure of Image-Forming Apparatus 211>

Figure 2:
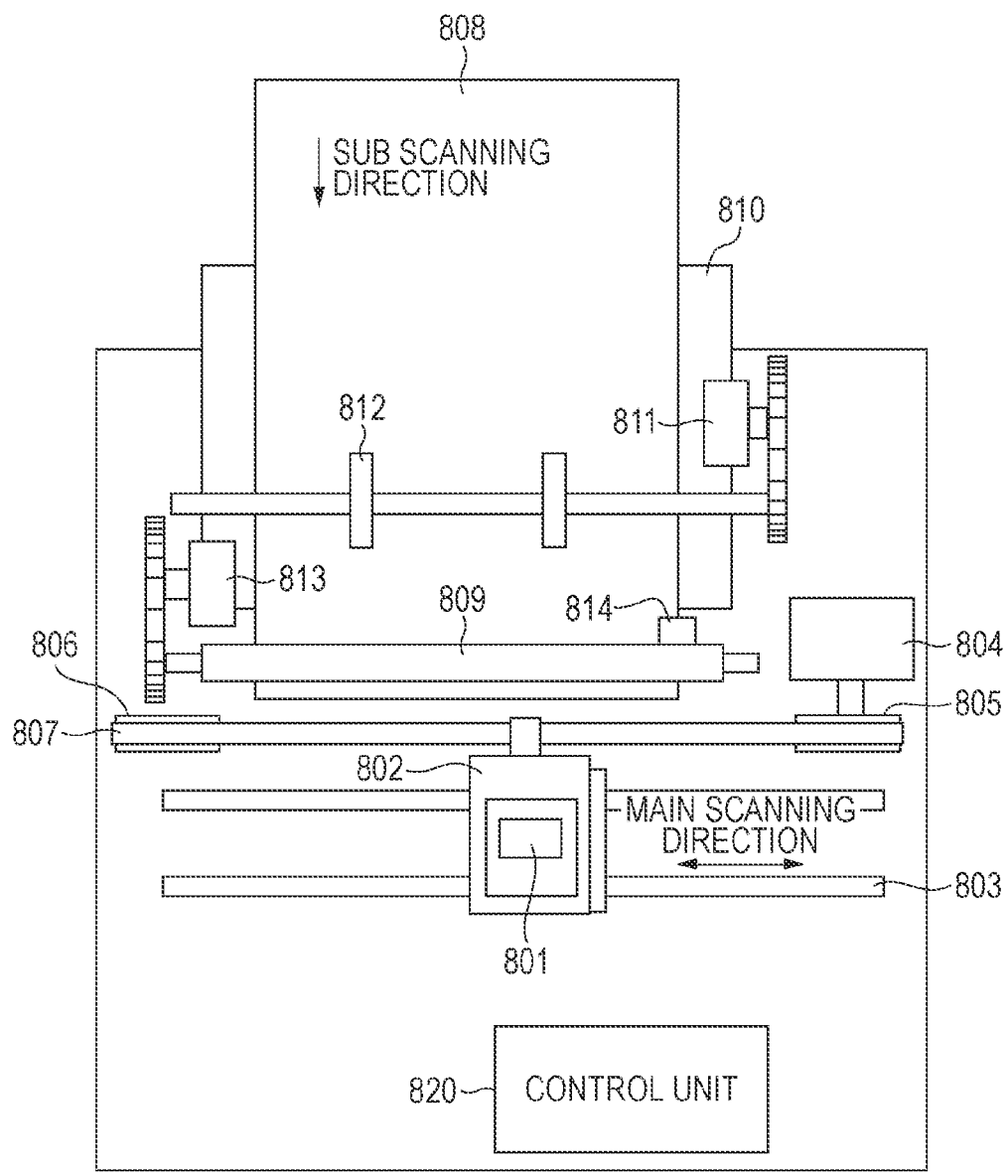
FIG. 2 illustrates the structure of an image-forming apparatus 211.

FIG. 2 illustrates the structure of the image-forming apparatus 211. According to the present embodiment, the image-forming apparatus 211 is an ink-jet printer that forms a three-dimensionally shaped article by applying the ink on the recording medium. The three-dimensionally shaped article includes the image layer that is formed by color ink and the uneven layer that is formed by clear ink.

A head cartridge 801 includes a recording head that has outlets and an ink tank that supplies the ink to the recording head. A connector that is used to receive a signal for driving the outlets of the recording head is provided. The ink tank separately contains 5 kinds of ink including the color ink in cyan, magenta, yellow, and black, and clear ink. The clear ink is an aqueous ink in which the concentration of a solid such as a resin is higher than that of the other ink. Accordingly, the image-forming apparatus 211 can form the unevenness by accumulating the solid of the clear ink on the recording medium. The head cartridge 801 is installed in position on a carriage 802 so as to be replaced. The carriage 802 includes a connector holder that transmits, for example, a drive signal to the head cartridge 801 via the connector. The carriage 802 can reciprocate along a guide shaft 803. Specifically, the carriage 802 uses a main-scanning motor 804 as a drive source and is driven by using a driving mechanism including, for example, a motor pulley 805, a driven pulley 806, and a timing belt 807, and the position and movement thereof is controlled. According to the present embodiment, movement of the carriage 802 along the guide shaft 803 is referred to as "main scanning", and the direction of the movement is referred to as a "main scanning direction". Recording media 808 such as print paper are placed on an automatic sheet feeder (referred to below as an "ASF") 810. When an image is formed, the drive of a sheet-feeding motor 811 causes a pickup roller 812 to rotate with a gear interposed therebetween, and the recording media 808 are separated one by one from the ASF 810 and fed. As a result of the rotation of a conveyance roller 809, the recording medium 808 is conveyed to a recording start position that faces the outlet surface of the head cartridge 801 on the carriage 802. The conveyance roller 809 uses a line field (LF) motor 813 as a drive source and is driven with a gear interposed therebetween. When the recording medium 808 passes through a paper end sensor 814, whether the recording medium 808 has been fed is determined, and the position at which the recording medium 808 has been fed is fixed. The head cartridge 801 that is installed on the carriage 802 is held such that the outlet surface protrudes downward from the carriage 802 and is parallel to the recording medium 808. A control unit 820 includes, for example, a CPU and a storage unit, receives data for forming the above layers from the outside, and controls the operation of each component of the image-forming apparatus 211, based on the data.

<Operation of Image-Forming Apparatus 211>

The operation of the image-forming apparatus 211 that has the structure illustrated in FIG. 2 to form the image layer and the uneven layer will now be described. According to the present embodiment, the recording medium 808 typically used is ink-jet paper.

When the recording medium 808 is conveyed and reaches a predetermined recording start position, the carriage 802 moves along the guide shaft 803 above the recording medium 808. During the movement, the color ink is discharged from the outlets of the recording head. When the carriage 802 moves and reaches an end of the guide shaft 803, the conveyance roller 809 conveys the recording medium 808 a predetermined distance in a direction perpendicular to the scanning direction of the carriage 802. According to the present embodiment, conveyance of the recording medium 808 is referred to as "paper feed" or "sub scanning". The direction of the conveyance is referred to as a "paper feed direction" or a "sub scanning direction". After the recording medium 808 is conveyed the predetermined distance, the carriage 802 moves again along the guide shaft 803. The scanning of the recording head with the carriage 802 and the paper feed are thus repeated, and the image layer is consequently formed on the recording medium 808. After the image layer is formed, the conveyance roller 809 returns the recording medium 808 to the recording start position. Subsequently, an uneven layer is formed by applying the clear ink on the image layer in the same process as with the formation of the image layer.

Figure 3:
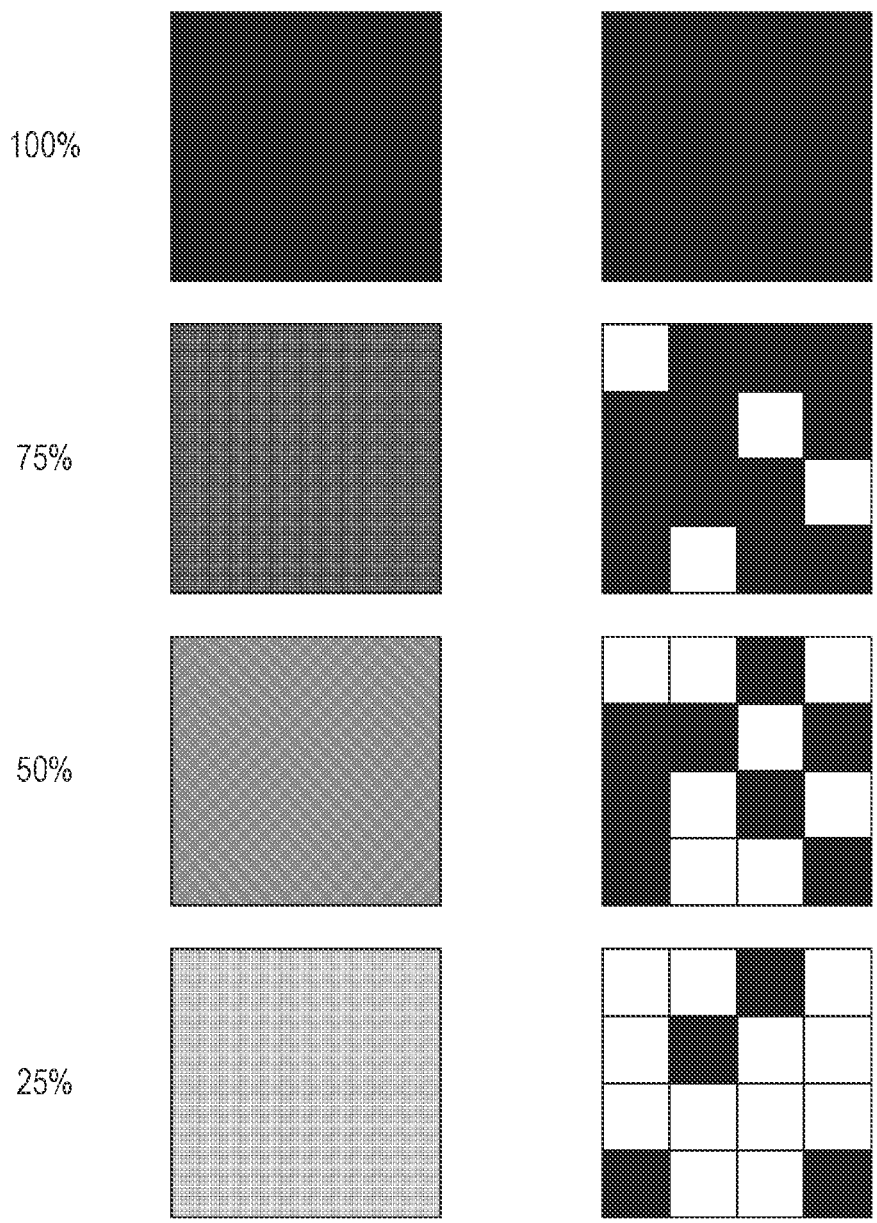
FIG. 3 schematically illustrates tone representations for an image by using an area coverage modulation.

FIG. 3 schematically illustrates representations for an image by using an area coverage modulation. According to the present embodiment, for convenience of description, the recording head is controlled by using a binary value that represents whether an ink droplet is discharged. According to the present embodiment, on and off of the ink are controlled for every pixel of an image that is outputted by the image-forming apparatus 211, and a state in which all of pixels in a unit area are set to on is referred to as a state in which a recording amount of ink is 100%. The word "on" means that the ink is to be discharged, and the word "off" means the ink is not to be discharged. A printer that is controlled by such a binary value can only represent a recording amount of 100% or 0% for a single pixel. Accordingly, halftone is represented in a group of pixels. In an example illustrated in FIG. 3, representation of a recording amount of 25% (4/16) in terms of an area is presented by discharging the ink to four pixels in a region of 4×4 pixels as illustrated at the lower right in the figure, instead of a halftone representation that is presented at the concentration of a recording amount of 25% over the entire region as illustrated at the lower left in the figure. The same representation can be presented with another tone. The total number of the pixels for the halftone representation and the pattern of the pixels that are set to on, for example, are not limited to the above example. The pattern of the pixels that are set to on can be determined by using a screen process of controlling the halftone or a halftone process with an error diffusion method. The present embodiment can be used for a printer that includes a recording head that can change the amount of discharged ink by expanding the above binarization process into a process of generating multivalued levels that can be modulated.

According to the present embodiment, the height is controlled at each position by using a concept of the recording amount of the ink described above. In a case when a substantially uniform layer is formed by using the ink in a recording amount of 100% during the formation of the uneven layer, the layer has a thickness (height) depending on the volume of the discharged ink. For example, if the layer that is formed in the case of a recording amount of 100% has a height of 2 µm, the layers are stacked ten times to reproduce a height of 20 µm. That is, the recording amount of the ink at a position at which the height needs to be 20 µm is 1000%.

Figure 4A:
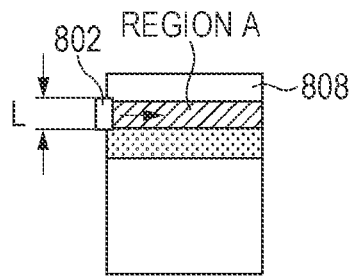
FIG. 4A is a diagram for a description of the operation of the image-forming apparatus 211 to form a shaped article on a recording medium.
Figure 4B:
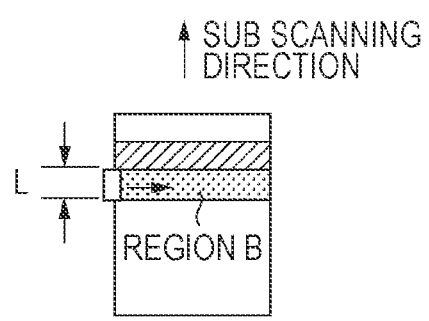
FIG. 4B is a diagram for a description of the operation of the image-forming apparatus 211 to form the shaped article on the recording medium.

FIGS. 4A to 4E are diagrams for a description of an operation to form the image layer and the uneven layer by scanning of the recording head above the recording medium 808. A layer is formed by the main scanning of the carriage 802 within the range of the width L of the recording head. Every time recording in a line ends, the recording medium 808 is conveyed a distance L in the sub scanning direction. According to the present embodiment, for conciseness of description, the image-forming apparatus 211 can discharge only the ink in a recording amount of 100% or less for every scanning. In a case when a layer having a recording amount of more than 100% is formed, the scanning is performed multiple times on the same region without conveyance. For example, in the case when the maximum recording amount of the ink is 500%, the scanning is performed 5 times in the same line. This will be described with reference to FIGS. 4A to 4E. After the scanning is performed five times on a region A by using the recording head (FIG. 4A), the recording medium 808 is conveyed in the sub scanning direction, and the main scanning is performed five times on a region B (FIG. 4B).

Figure 4C:
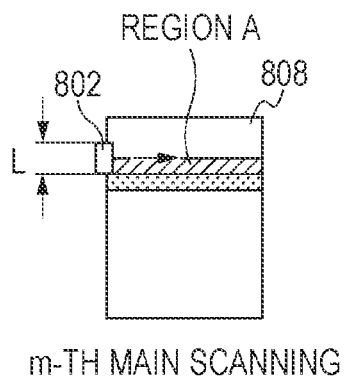
FIG. 4C is a diagram for a description of the operation of the image-forming apparatus 211 to form the shaped article on the recording medium.
Figure 4D:
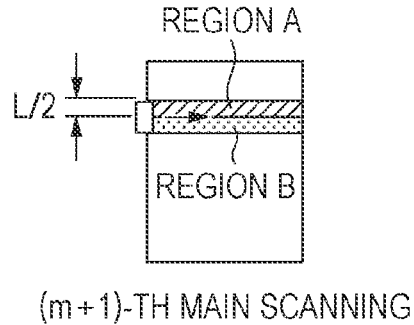
FIG. 4D is a diagram for a description of the operation of the image-forming apparatus 211 to form the shaped article on the recording medium.
Figure 4E:
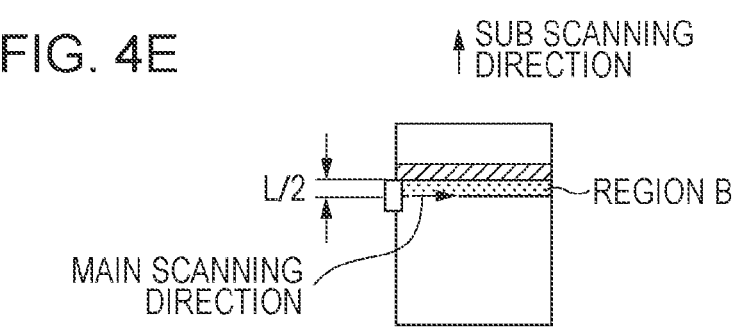
FIG. 4E is a diagram for a description of the operation of the image-forming apparatus 211 to form the shaped article on the recording medium.

To inhibit image quality from being degraded such as periodic irregularity due to the accuracy of the drive of the recording head, even in some cases when the recording amount is 100% or less, the scanning is performed multiple times, which is referred to as multipath. FIG. 4C to 4E illustrate an example of two paths. In this example, a layer is formed by the main scanning of the carriage 802 within the range of the width L of the recording head, and, every time recording in a line ends, the recording medium 808 is conveyed a distance of L/2 in the sub scanning direction. In the region A, the ink is applied by the m-th main scanning (FIG. 4C) of the recording head and the (m+1)-th main scanning (FIG. 4D). In the region B, the ink is applied by the (m+1)-th main scanning (FIG. 4D) of the recording head and the (m+2)-th main scanning (FIG. 4E). Here, the operation of two paths is described. However, the number of the paths for recording can be changed depending on predetermined accuracy. In the case of n paths for recording, for example, every time recording in a line ends, the recording medium 808 is conveyed a distance L/n in the sub scanning direction. In this case, the dot arrangement is determined for every path even when the recording amount of the ink is 100% or less, and the uneven layer and the image layer are formed in a manner in which the main scanning of the recording head is performed n times in the same line on the recording medium. According to the present embodiment, no multipath is used to prevent scanning by using the above multipath and scanning for applying the ink in an amount of 100% or more from being mixed up. In the description, the scanning is performed multiple times to stack layers. The recording medium 808 is not limited to paper. Various materials can be used, provided that the materials can be used to form the layers by using the recording head.

<Shaped Article Formed on Recording Medium>

Figure 5A:
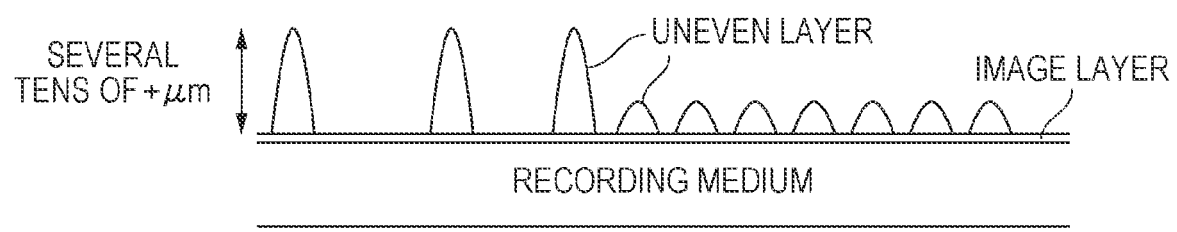
FIG. 5A illustrates a section of a shaped article that is formed on the recording medium.

FIG. 5A is a sectional view of a shaped article that is formed on a recording medium and that includes the image layer and the uneven layer. According to the present embodiment, the image layer is formed on a surface of the recording medium, and the uneven layer that has a height distribution the maximum of which is about several tens of μm is formed thereon. Strictly speaking, the image layer has a height distribution. However, the height distribution can be ignored because the thickness is sufficiently smaller than that of the uneven layer, and the effect thereof on the shape of the shaped article is subtle. For example, the height that the shape data represents may be corrected in consideration of the height distribution of the image layer.

<Processing Performed by Image-Processing Apparatus 1>

Figure 6A:
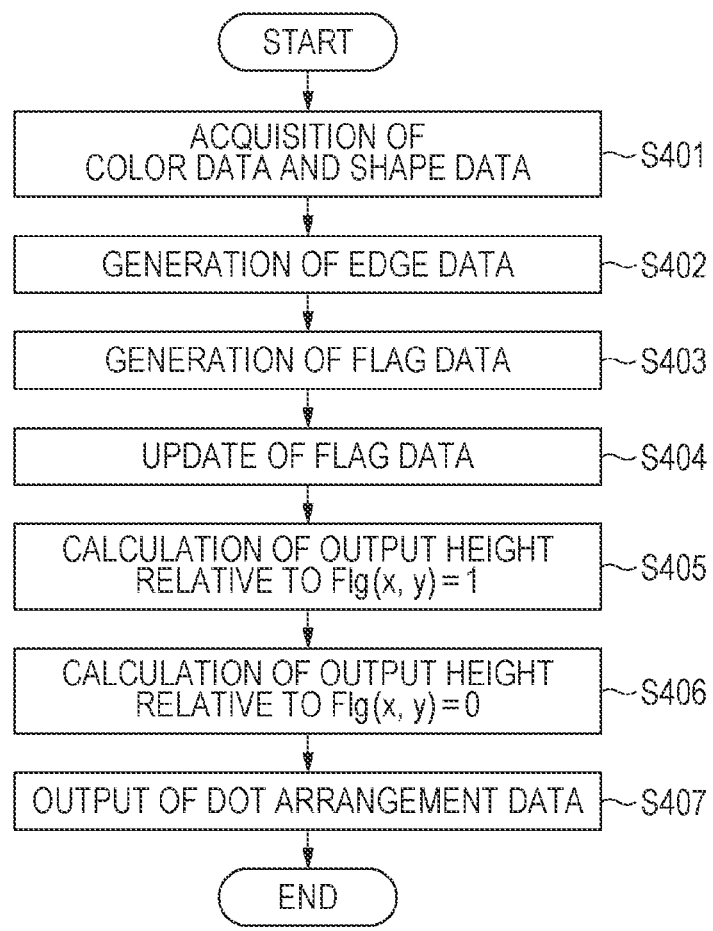
FIG. 6A is a flowchart illustrating a processing that is performed by the image-processing apparatus 1.

FIG. 6A is a flowchart illustrating a flow until the image-processing apparatus 1 outputs data for forming the three-dimensionally shaped article on the recording medium to the image-forming apparatus 211. In the following description, steps (processes) are expressed with S at the beginning of the reference characters.

At S401, the acquisition member 301 acquires, from the external device such as the HDD 213, the color data that represents the color of the image layer that is formed on the recording medium and the shape data that represents the height of the surface of the uneven layer from the reference surface. According to the present embodiment, polygon data including the color data and the shape data is acquired. The polygon data is data that is typically used for three-dimensional computer graphics (3DCG), includes the coordinates (x, y, z) of the vertices of a triangle, and is expressed by surface groups that are defined by vertex groups. According to the present embodiment, the polygon data has RGB values (color data) for every set of the coordinates of the vertices. The height (shape data) is expressed by the z-value of the coordinates of the vertices. A reference surface for the height of the shaped article, that is, a surface having a z-value of zero coincides with the surface of the recording medium. The color data is RGB data that is included in a file format that is used for 3DCG.

According to the present embodiment, the color data and the shape data are collectively acquired as the polygon data but may be acquired as separate data. For example, the color data may be image data in which RGB values that are defined in a sRGB space or RGB values that are defined in an Adobe RGB space are recorded in each pixel. Examples of the image data that is recorded in each pixel may include L*a*b* values that are defined in an L*a*b* space, XYZ values that are tristimulus values of color, or spectral reflectance. Provided that the shape data represents the shape of the uneven layer, the shape data may be, for example, point group data that is expressed by a group of vertices (x, y, z) in a three-dimensional space or data that represents spatial distribution of height or a normal.

At S402, the generation member 302 generates edge data E, based on the shape data that is acquired at S401. Specifically, vertex coordinate data that is included in the polygon data is converted into height data H. Linear interpolation is applied to the vertex coordinate data with a predetermined resolution, and the data is converted into the height data H that represents the height at regular intervals. According to the present embodiment, the interpolation is applied at 1200 dpi. The method of the interpolation is not limited to the linear interpolation but can be known interpolation such as nearest neighbor interpolation, bicubic interpolation, or spline interpolation. The height data H that is acquired by the interpolation is converted into the edge data E by using the following expression (1).

$$E = H * F_{lap} \quad \text{[Math. 1]}$$

$$F_{lap} = \begin{bmatrix} 0 & -1 & 0 \\ -1 & 4 & -1 \\ 0 & -1 & 0 \end{bmatrix} \quad \text{Expression (1)}$$

Figure 7A:
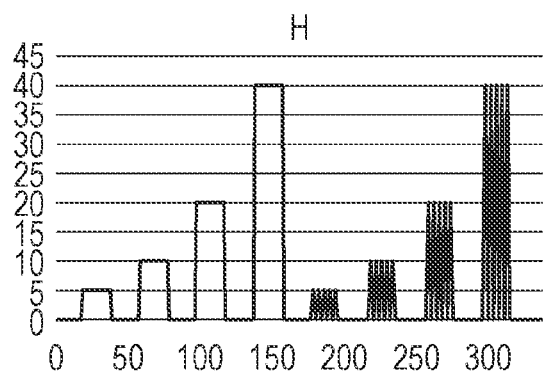
FIG. 7A illustrates an example of data that is used for processing that is performed by the image-processing apparatus 1.
Figure 7B:
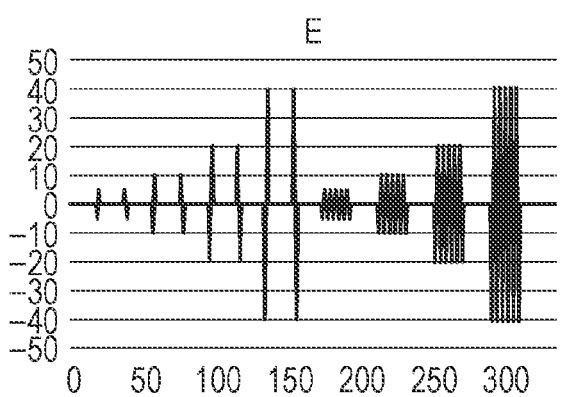
FIG. 7B illustrates an example of data that is used for processing that is performed by the image-processing apparatus 1.

Here, the symbol * represents a convolution integral, and $F_{lap}$ is a secondary differential filter. According to the present embodiment, the secondary differential filter is a Laplacian filter but may be a primary differential filter such as a Prewitt filter or a Sobel filter. Another known edge detection algorithm may be used. FIG. 7A illustrates the height distribution of the height data H. FIG. 7B illustrates the height distribution of the edge data E. The height data H and the edge data represent two-dimensional height distribution but are described as one-dimensional height distribution for simplicity of description. In FIG. 7A and FIG. 7B, the horizontal axis represents a coordinate on the surface of the recording medium with respect to the x-axis, and the vertical axis represents the height [μm]. The height distribution in FIG. 7B includes a minus value. However, a typical image-forming apparatus cannot reproduce a height of a minus value. In addition, the height that can be outputted is typically restricted. In view of this, a clipping process is performed on the height distribution that the edge data E represents into a range that can be outputted by the image-forming apparatus 211, by using the following expression (2).

[Math. 2]

$$\text{if } (E(x,y)<0), E(x,y)=0$$

$$\text{if } (E(x,y)>T\text{max}), E=T\text{max} \quad \text{Expression (2)}$$

Figure 7C:
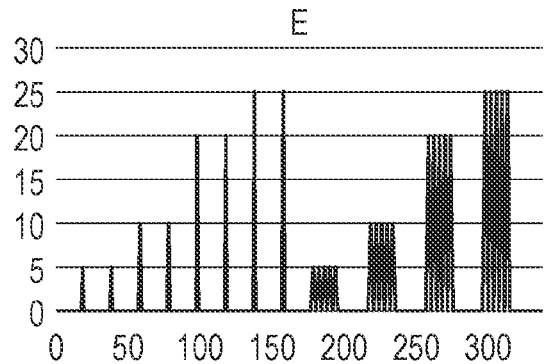
FIG. 7C illustrates an example of data that is used for processing that is performed by the image-processing apparatus 1.

Here, (x, y) represents the coordinates of the pixels, and E (x, y) represents the pixel value (height) of the edge data E at the coordinates (x, y). Tmax represents the maximum height that can be outputted by the image-forming apparatus 211. According to the present embodiment, Tmax=25 µm holds. FIG. 7C illustrates the height distribution of the edge data E after the clipping process. According to the present embodiment, the clipping process is performed by using Tmax. However, Tmax may be multiplied by a coefficient so as to be equal to the maximum value of E (x, y) for linear compression or a freely selected polynomial may be used for compression.

At S403, the first determination member 303 determines whether the pixel value of each pixel of the edge data E that is generated at S402 is equal to or more than a predetermined threshold th. Based on the result of the determination, flag data Flg in which flag information is recorded in the pixel having the pixel value equal to or more than the predetermined threshold th is generated as defined as expression (3).

[Math. 3]

$$\text{if } (E(x,y) \geq th), Flg(x,y)=1$$

$$\text{else, } Flg(x,y)=0 \quad \text{Expression (3)}$$

Figure 7D:
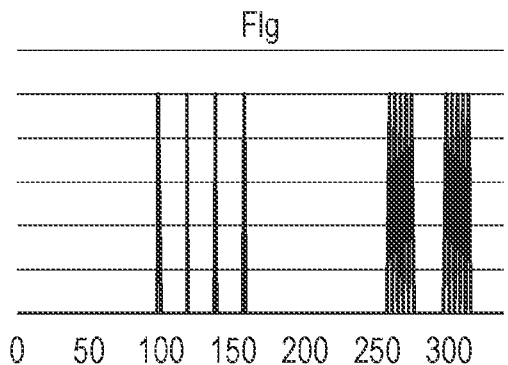
FIG. 7D illustrates an example of data that is used for processing that is performed by the image-processing apparatus 1.

Here, Flg (x, y) represents the pixel value (flag information) of the flag data Flg at the coordinates (x, y). According to the present embodiment, the threshold th is 20 µm. Human beings can recognize a step having a size of about 20 µm or more as a three-dimensional shape as described above. Accordingly, the flag data Flg is used to distinguish the edges that the edge data E represents into an edge that is likely to be recognized as the unevenness and an edge that is unlikely to be recognized as the unevenness. Regarding the edge that satisfies Flg (x, y)=1, the height is accurately reproduced or the height is reproduced so as to be emphasized. Regarding the edge that satisfies Flg (x, y)=0, however, the height is reproduced so as to be reduced. Consequently, the amount of the ink that is consumed can be reduced. FIG. 7D illustrates an example of the flag data Flg.

At S404, the second determination member 304 updates the pixel value of the flag data Flg, based on the edge data E that is generated at S402. The pixel value Flg (x, y) is updated by using the following expression (4).

[Math. 4]

$$D(x,y)=E(x,y)*F_{mov}$$

$$\text{if } (Flg(x,y)=1 \text{ and } D(x,y)>th2), Flg(x,y)=0 \quad \text{Expression (4)}$$

Figure 7E:
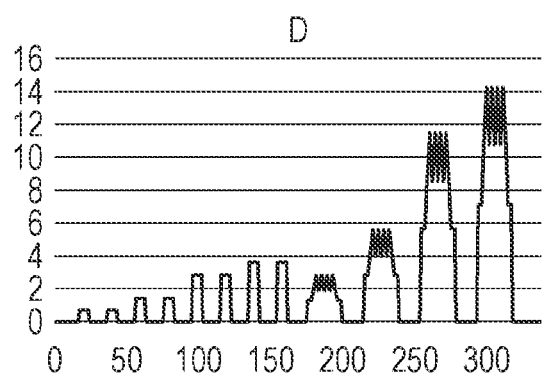
FIG. 7E illustrates an example of data that is used for processing that is performed by the image-processing apparatus 1.
Figure 7F:
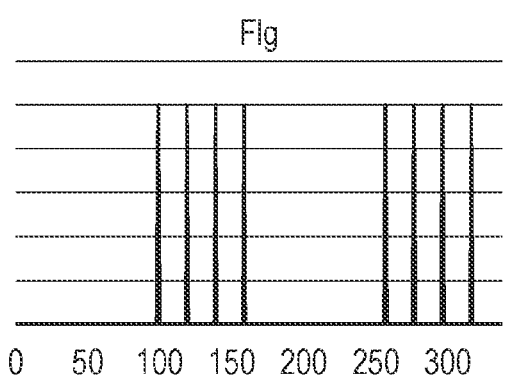
FIG. 7F illustrates an example of data that is used for processing that is performed by the image-processing apparatus 1.

Here, $F_{mov}$ is a moving average filter that is used to calculate the density D of the edges near a noteworthy pixel. According to the present embodiment, the moving average filter of 7×7 pixels is used. It is represented that, as the value of D of a pixel increases, the density of the edges near the pixel increases. When the value of D is more than a predetermined threshold th2, at S403, the pixel value of the pixel that satisfies Flg (x, y)=1 is changed into Flg (x, y)=0. When the value of D is equal to or less than the threshold, the pixel value is not changed. Even when a local step in the unevenness is large, this process is performed if the unevenness has similar dense portions, because the unevenness that has the dense portions is unlikely to be recognized as a three-dimensional shape. FIG. 7E illustrates an example of the density D of the edges. FIG. 7F illustrates an example of the updated flag data Flg. According to the present embodiment, the moving average filter of 7×7 pixels is used. However, another known smoothing filter (low-pass filter) such as a Gaussian filter or a rectangular window may be used. The filter size is not limited to 7×7 pixels.

At S405, the first conversion member 305 converts the pixel value of the pixel of the edge data E corresponding to the pixel that satisfies Flg (x, y)=1 in the flag data Flg that is acquired at S404 into an output height $H_{out}$ (x, y). Expression (5) is used for conversion.

[Math. 5]

$$\text{if } (Flg(x,y)=1), H_{out}(x,y)=\text{gamma1}(E(x,y)) \quad \text{Expression (5)}$$

Here, gamma1 is a function of tone conversion of the height. According to the present embodiment, tone conversion characteristics are linear, and the pixel value E (x, y) of the inputted edge data is outputted as it is.

At S406, the second conversion member 306 converts the pixel value of the pixel of the edge data E corresponding to the pixel that satisfies Flg (x, y)=0 in the flag data Flg that is acquired at S404 into the output height $H_{out}$ (x, y). Expression (6) is used for conversion.

[Math. 6]

$$\text{if } (Flg(x,y)=0), H_{out}(x,y)=\text{gamma0}(E(x,y)) \quad \text{Expression (6)}$$

Here, gamma0 is a function of the tone conversion of the height. According to the present embodiment, the pixel value E (x, y) of the inputted edge data is quartered and outputted.

At S407, the output member 307 generates the dot arrangement data that represents the dot arrangement of the ink that is applied to the recording medium and outputs the generated dot arrangement data to the image-forming apparatus 211. Specifically, the color data that is acquired at S401 is acquired, the linear interpolation is performed so as to acquire data at a resolution of 1200 dpi, and resolution conversion into resolution at which the printer can output is performed. A known color separation process is performed based on the color data after the resolution conversion to generate first recording amount data that represents the recording amount of the color ink that is used to form the image layer on the recording medium. Furthermore, a known halftone process is performed based on the first recording amount data to generate first dot arrangement data that represents the dot arrangement of the color ink on the recording medium. Output shape data $H_{out}$ that represents the output height $H_{out}$ (x, y) that is generated at S405 and S406 is acquired, and second recording amount data that represents the recording amount of the clear ink that is used to form the uneven layer on the recording medium is generated based on the output shape data $H_{out}$. The second recording amount data is generated by using a table that has a relationship between the output height $H_{out}$ (x, y) and the recording amount of the clear ink. Furthermore, second dot arrangement data that represents the dot arrangement of the clear ink on the recording medium is generated based on the second recording amount data. The first dot arrangement data and the second dot arrangement data that are generated by the above processes are outputted to the image-forming apparatus 211, and the processing ends. The image-forming apparatus 211 forms the image layer and the uneven layer on the recording medium, based on the received dot arrangement data. The data that is outputted to the image-forming apparatus 211 by the output member 307 may be the above recording amount data, provided that the image-forming apparatus 211 can form the image layer and the uneven layer on the recording medium. A known path separation process may be used to output data that is generated from the above dot arrangement data and that represents the dot arrangement of the ink on the recording medium per recording scanning.

Figure 7G:
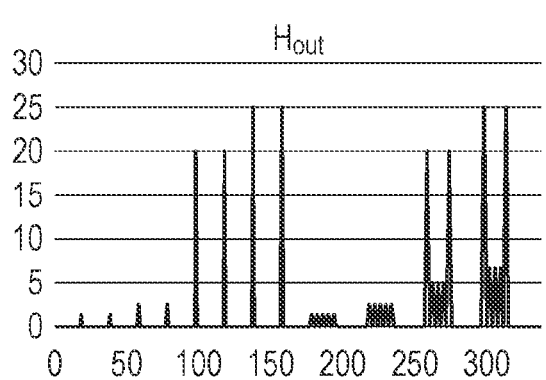
FIG. 7G illustrates an example of data that is used for processing that is performed by the image-processing apparatus 1.

FIG. 7G illustrates an example of the output shape data $H_{out}$. The degree of reproduction of the height that the output shape data represents changes depending on the flag data. Accordingly, the consumption of the ink that is used to form the edge that is unlikely to be recognized as a three-dimensional shape can be reduced. Regarding the dense edges that are unlikely to be recognized as the unevenness, the ink consumption can be reduced because the amplitude is reduced.

<Effects according to First Embodiment>

As described above, the image-processing apparatus according to the present embodiment acquires first shape data that represents the shape of the unevenness and generates the edge data that represents the shape of each edge of the unevenness, based on the first shape data. The first recording amount data that represents the recording amount of a first recording material that is used to form at least a part of the edge in the edge data on the recording medium, or the first dot arrangement data that represents the dot arrangement of the first recording material on the recording medium is generated based on the edge data. This enables an edge portion that is likely to be recognized as a three-dimensional shape to be formed on the recording medium among shapes that the shape data represents and achieves the same degree of the stereoscopic effect as in the case when unevenness having the shapes that the shape data represents is formed on the recording medium. In addition, the consumption of the recording material that is used to form the unevenness on the recording medium can be reduced. In the case when the unevenness is formed by using aqueous ink as in the present embodiment, the recording medium soaks water that is a solvent of the ink, and a solid that remains on the surface forms the unevenness. In this case, the amount of the water that the recording medium can soak is limited, and it is difficult to form the unevenness with a large volume. The use of the processing according to the present embodiment enables the consumption of the recording material that is used to form the unevenness to be reduced. Accordingly, even in the case of using the aqueous ink, a large amount of the ink does not need to be consumed, and the unevenness can be reproduced on the recording medium.

Second Embodiment

The data that is generated according to the first embodiment is used to form the shaped article that includes the image layer that represents the color and the uneven layer that has the unevenness on the recording medium. Data that is generated according to the present embodiment is used to form a shaped article that includes a glossy layer that represents gloss on the recording medium in addition to the image layer that represents the color and the uneven layer that has the unevenness. The hardware configuration and logical configuration of the image-processing apparatus 1 according to the present embodiment are the same as those according to the first embodiment, and a description thereof is omitted. The image-forming apparatus 211 has gloss control ink for controlling the gloss in addition to the four kinds of the color ink and the clear ink. The gloss control ink will be described in detail later. The image-forming apparatus 211 forms the glossy layer on the uneven layer by using the gloss control ink through the same operation as the operation to form the image layer and the uneven layer. Differences between the present embodiment and the first embodiment will be mainly described below.

<Shaped Article Formed on Recording Medium>

Figure 5B:
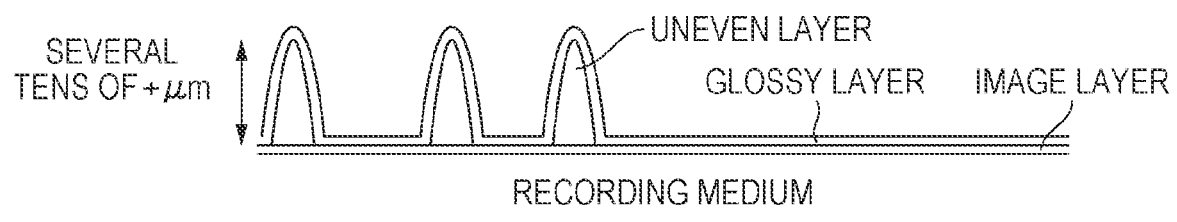
FIG. 5B illustrates a section of a shaped article that is formed on the recording medium.

FIG. 5B is a sectional view of the shaped article that includes the glossy layer, the uneven layer, and the image layer formed on the recording medium. According to the present embodiment, the image layer is formed on a surface of ink-jet paper, the uneven layer that has height distribution the maximum of which is about several tens of μm is formed thereon, and the glossy layer is formed thereon. The gloss control ink that is used to form the glossy layer forms fine unevenness having a size of less than 0.1 μm on the surface of the uneven layer and controls the gloss of the shaped article depending on the recording amount of the ink or an applied area.

<Processing Performed by Image-Processing Apparatus 1>

Figure 6B:
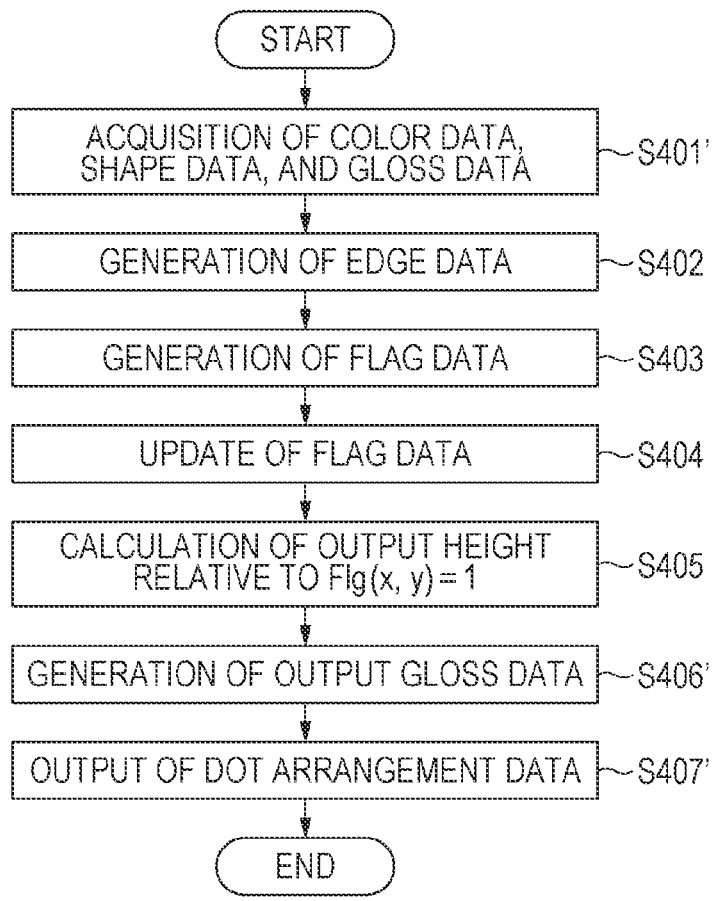
FIG. 6B is a flowchart illustrating a processing that is performed by the image-processing apparatus 1.

FIG. 6B is a flowchart illustrating a flow until the image-processing apparatus 1 outputs data for forming the three-dimensionally shaped article on the recording medium to the image-forming apparatus 211. S402 to S405 are the same as S402 to S405 according to the first embodiment, and a description thereof is omitted.

At S401', the acquisition member 301 acquires, from the external device such as the HDD 213, the color data that represents the color of the image layer that is formed on the recording medium, the shape data that represents the height of the surface of the uneven layer from the reference surface, and the gloss data that represents gloss representation quality of the glossy layer. According to the present embodiment, polygon data that includes the color data, the shape data, and the gloss data is acquired. According to the present embodiment, the polygon data has the RGB values (color data) and a value (gloss data) that represents the gloss representation quality for every set of the coordinates of the vertices. The height (shape data) is represented by the z-value of the coordinates of the vertices.

According to the present embodiment, the color data, the shape data, and the gloss data are collectively acquired as the polygon data but may be acquired as separate data. For example, the gloss data may be data that represents the gloss characteristic of the glossy layer and may be, for example, diffuse reflection component data that is included in a file format that is used for 3DCG. The data may represent the spatial distribution of the degree of mirror gloss that is measured by a method of JISZ8741, or may represent the spatial distribution of the degree of image sharpness that is measured by a method of JISK7174 or JISH8686. The data may represent the spatial distribution of a reflection haze value that is measured by a method of ISO13803 or ASTME430.

At S406', the second conversion member 306 generates output gloss data G, based on the gloss data that is acquired at S401' and the pixel value of the pixel of the edge data E corresponding to the pixel that satisfies Flg (x, y)=0 in the flag data that is acquired at S404. Specifically, the gloss data that is acquired at S401' is acquired, and the linear interpolation is performed so as to acquire data at a resolution of 1200 dpi, and the output gloss data G is generated. The output gloss data G is corrected, based on the pixel value of the pixel of the edge data E corresponding to the pixel that satisfies Flg (x, y)=0 in the flag data that is acquired at S404 by using the following expression (7).

[Math. 7]

$$\text{if } (Flg(x,y)=0), G(x,y)=G(x,y)+k \times E(x,y) \quad \text{Expression (7)}$$

Here, k is a coefficient that is used to convert E (x, y) into the value that represents the gloss representation quality. E (x, y) that satisfies Flg (x, y)=0 represents fine unevenness. The fine unevenness that is formed on the recording medium is unlikely to be recognized as a three-dimensional shape. In many cases, the unevenness having a size of less than 20 μm is perceived as the texture of a plane such as a sense of gloss or a sense of a mat instead of a three-dimensional shape as described above. In view of this, at this step, E (x, y) that satisfies Flg (x, y)=0 is converted into G (x, y) that is used to control the gloss.

The gloss control ink that is used according to the present embodiment can roughen the surface of the uneven layer because the size of resin dispersing therein is larger than that in the clear ink that is used to form the unevenness, and an increased amount of incident light can be diffused and reflected. Accordingly, the gloss can be controlled in a recording amount smaller than that of the clear ink that is used to form the unevenness. In view of this, in the case when E (x, y) in expression (7) is large, it is necessary to represent the gloss of a rough surface of the uneven layer, and the gloss representation quality G (x, y) is corrected so as to be reduced. In the case when E (x, y) is small, it is necessary to represent the gloss of a smooth surface of the uneven layer, and the gloss representation quality G (x, y) is corrected so as to be enhanced. According to the present embodiment, the coefficient k is accordingly set to a minus value in advance. According to the present embodiment, the clear ink that has a large resin size is used as the gloss control ink. However, another ink may be used provided that the other ink enables the gloss to be controlled in a small recording amount, for example, ink that has a small resin size and low viscosity may be used to increase the degree of the gloss. The value of the coefficient k can be set depending on the gloss control ink. According to the present embodiment, k is the coefficient but may be a freely selected function.

At S407', the output member 307 generates the dot arrangement data that represents the dot arrangement of the ink that is applied to the recording medium and outputs the generated dot arrangement data to the image-forming apparatus 211. Specifically, the color data that is acquired at S401' is acquired, and the first dot arrangement data that represents the dot arrangement of the color ink on the recording medium is generated based on the color data. The output shape data $H_{out}$ that is generated at S405 is acquired, and the second dot arrangement data that represents the dot arrangement of the clear ink on the recording medium is generated based on the output shape data $H_{out}$. A method of generating the first dot arrangement data and a method of generating the second dot arrangement data are the same as those according to the first embodiment, and a description thereof is omitted. Furthermore, the output gloss data G that is generated at S406' is acquired, and third recording amount data that represents the recording amount of the gloss control ink is generated based on the output gloss data G. The third recording amount data is generated by using a table that has a relationship between the gloss representation quality $G_{out}$ (x, y) and the recording amount of the gloss control ink. Third dot arrangement data that represents the dot arrangement of the gloss control ink on the recording medium is generated based on the third recording amount data. The first dot arrangement data, the second dot arrangement data, and the third dot arrangement data that are generated by the above processes are outputted to the image-forming apparatus 211, and the processing ends.

<Effects according to Second Embodiment>

As described above, the image-processing apparatus according to the present embodiment forms the unevenness that is unlikely to be recognized as a three-dimensional shape and that is used to control the gloss on the recording medium. Consequently, the reproduction can be made with a height of the unevenness that is unlikely to be recognized as a three-dimensional shape being reduced, and the unevenness that is unlikely to be recognized as a three-dimensional shape can be formed by using the gloss control ink that enables the gloss to be controlled in a small recording amount. Accordingly, the consumption of the recording material that is used to form the unevenness on the recording medium can be reduced.

Third Embodiment

According to the first embodiment, the edge portion of the unevenness is reproduced on the recording medium by generating the edge data by using the differential filter. According to the present embodiment, the low frequency component of the unevenness to be reproduced is calculated, and the high frequency component corresponding to the edge data is calculated by subtracting the calculated low frequency component from the unevenness to be reproduced. The hardware configuration and logical configuration of the image-processing apparatus 1 according to the present embodiment are the same as those according to the first embodiment, and a description thereof is omitted. Differences between the present embodiment and the first embodiment will be mainly described below.

<Processing Performed by Image-processing Apparatus 1>

Figure 6C:
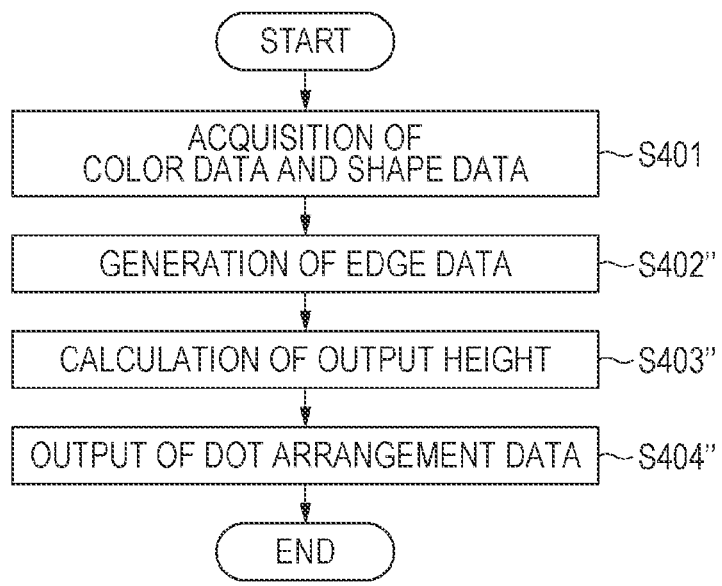
FIG. 6C is a flowchart illustrating a processing that is performed by the image-processing apparatus 1.

FIG. 6C is a flowchart illustrating a flow until the image-processing apparatus 1 outputs data for forming the three-dimensionally shaped article on the recording medium to the image-forming apparatus 211. S401 is the same as S401 according to the first embodiment, and a description thereof is omitted.

At S402", the generation member 302 generates the edge data E, based on the shape data that is acquired at S401. Specifically, the vertex coordinate data that is included in the polygon data is converted into the height data H. The linear interpolation is applied to the vertex coordinate data with predetermined resolution, and the data is converted into the height data H that represents the height at regular intervals. The height data H that is acquired by the interpolation is converted into the edge data E by using the following expression (8).

[Math. 8]

$$E' = H - k * H * F_{gauss} \quad \text{Expression (8)}$$

$$F_{gauss} = \frac{1}{16} \begin{bmatrix} 1 & 2 & 1 \\ 2 & 4 & 2 \\ 1 & 2 & 1 \end{bmatrix}$$

Figure 8A:
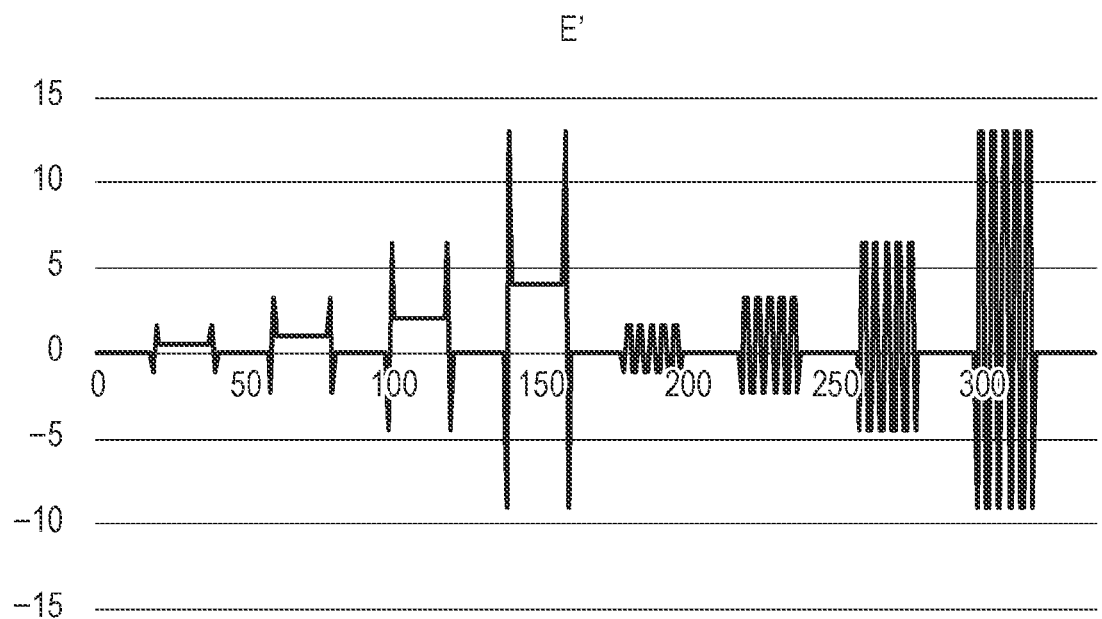
FIG. 8A illustrates an example of data that is used for processing that is performed by the image-processing apparatus 1.

Here, $F_{gauss}$ is a Gaussian filter, and the result of convolution into the height data H can be used as the low frequency component of the unevenness corresponding to the height data. According to the present embodiment, a Gaussian filter is used. However, another low-pass filter such as a moving average filter may be used. Here, k is a freely determined coefficient and enables the amount of the low frequency component that remains in the edge data E to be controlled. For example, when k=0.9, the low frequency component corresponding to 1/10 of the height data H can remain in the edge data E. When k=1.0, the low frequency component can be removed to the same degree as in the first embodiment. The use of the coefficient k enables the reproduction to be made with the height reduced to a freely determined degree also regarding gentle unevenness that is included in the unevenness to be reproduced. FIG. 8A illustrates the height distribution in the edge data E that is generated based on the height data in FIG. 7A.

At S403'', the first conversion member 305 converts the pixel value of the pixel of the edge data E into the output height $H_{out}$ (x, y). Expression (9) is used for conversion.

[Math. 9]

$$H_{out} = \text{gamma2}(E') \qquad \text{Expression (9)}$$

Figure 8B:
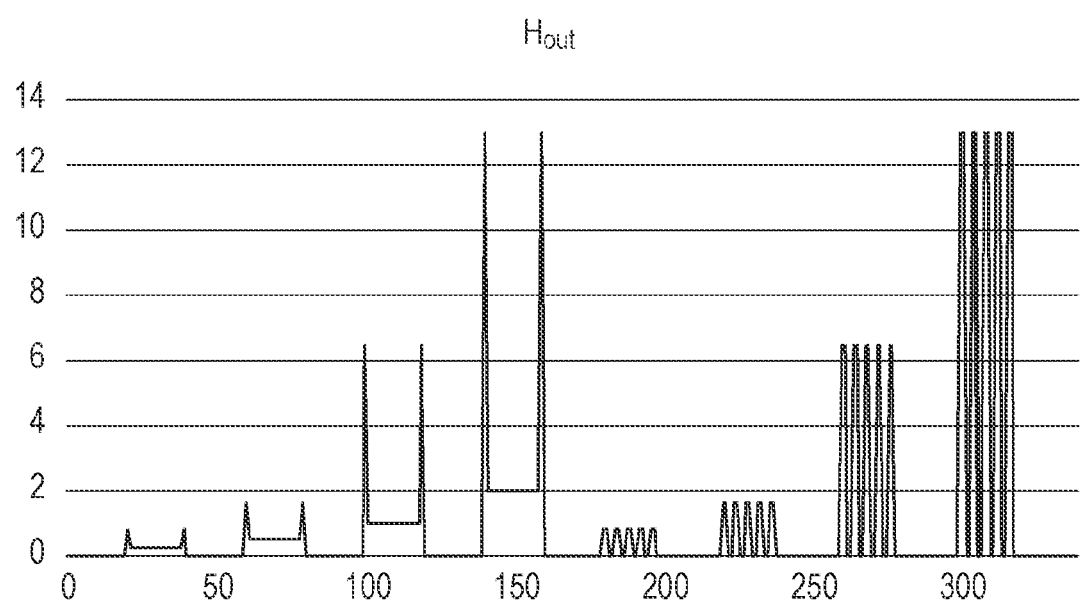
FIG. 8B illustrates an example of data that is used for processing that is performed by the image-processing apparatus 1.
Figure 9:
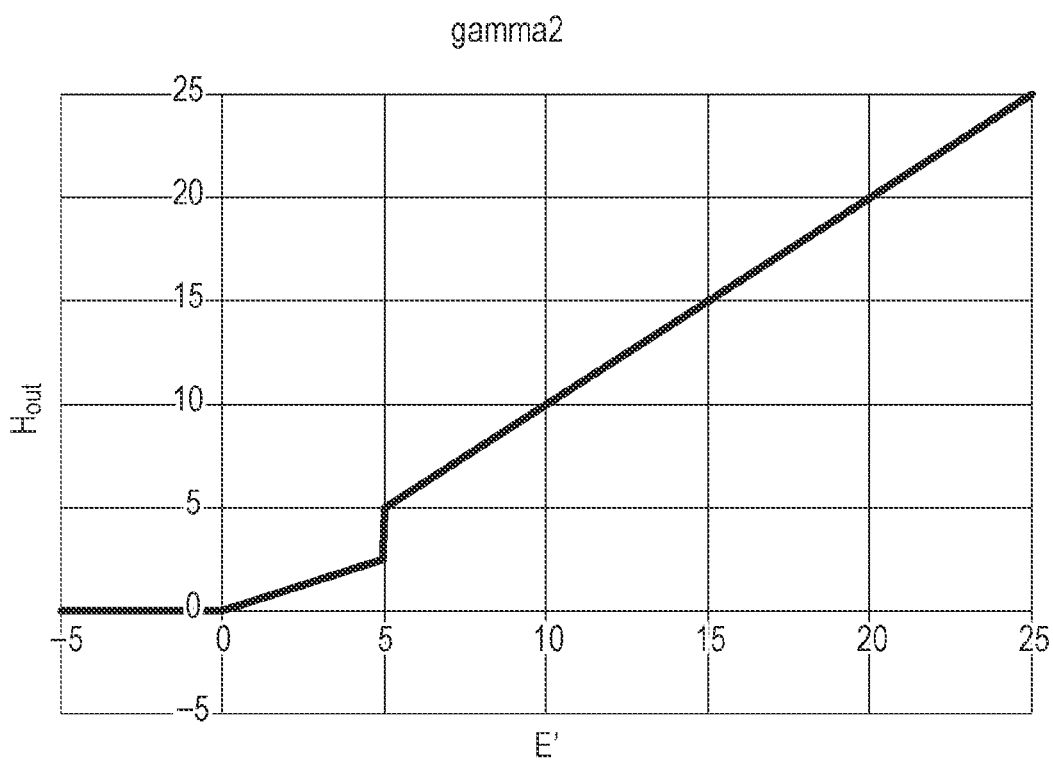
FIG. 9 illustrates tone conversion characteristics.

FIG. 9 illustrates the tone conversion characteristics of gamma2. The horizontal axis represents the height in the edge data E. The vertical axis represents the output height $H_{out}$ (x, y). As a result of this conversion, the height having a minus value is changed into zero as in the first embodiment. According to the present embodiment, the threshold for the height in the edge data E is five. A value equal to or more than the threshold is outputted as it is, but a value less than the threshold is outputted as ½ of the height. The upper limit of the height that the image-forming apparatus 211 can output will be described later. FIG. 8B illustrates the distribution of the output height $H_{out}$ (x, y). Through the tone conversion process according to the present embodiment, the edges of the unevenness to be reproduced can be distinguished between the edge that is likely to be recognized as the unevenness and the edge that is unlikely to be recognized as the unevenness, and the same effects as in the case when the tone conversion is individually performed can be achieved.

At S404'', the output member 307 generates the first dot arrangement data that represents the dot arrangement of the color ink on the recording medium as in S407 according to the first embodiment. The output member 307 also generates the second recording amount data that represents the recording amount of the clear ink that is used to form the uneven layer on the recording medium as in S407 according to the first embodiment. Subsequently, the output member 307 corrects the recording amount $CL_{out}$ of the clear ink that the second recording amount data represents, based on the upper limit of the recording amount of the ink depending on the recording medium used. Expression (10) is used for correction.

[Math. 10]

$$CL_{ave} = CL_{out} * F_{mov}$$

$$\text{if } (CL_{ave}(x,y) < th), CL_{ave}(x,y) = th$$

$$CL_{out}(x,y) = CL_{out}(x,y) \cdot th / CL_{ave}(x,y) \qquad \text{Expression (10)}$$

Here, $CL_{ave}$ represents the amount of the ink that is applied to a peripheral region around a noteworthy point per unit area, and $F_{mov}$ is a moving average filter with respect to the peripheral region. Here, th is a threshold depending on the upper limit of the amount of the ink that the recording medium can soak in the peripheral region. $CL_{out}$ at coordinates at which the average amount of the ink $CL_{ave}$ in the peripheral region is equal to or more than threshold is converted into the amount of the ink corresponding to the threshold. This process is performed in consideration of the following characteristic: the amount of the ink that the recording medium can soak at a point on the recording medium changes depending on the state of the ink applied in a peripheral region thereof. For example, a so-called solid image that is uniform is recorded in a region of 10 pixels×10 pixels, the maximum amount of the ink that the recording medium can soak per pixel is designated by V. It is thought that the ink is applied to only one pixel in the region of 10 pixels×10 pixels. Moisture that is the solvent of the ink applied thereto is soaked in a peripheral region to which the ink is not applied. Accordingly, the ink in an amount more than V can be applied to the one pixel. This correction process enables the upper limit of the recording amount of the ink to be changed depending on the state of recording in the peripheral region and enables the unevenness to be formed with an increased size in the case of a sparse pattern in which the ink is less applied to the peripheral region. The output member 307 generates the second dot arrangement data, based on the second recording amount data that represents the corrected recording amount, outputs the generated second dot arrangement data to the image-forming apparatus 211, and ends the processing. According to the present embodiment, after the second recording amount data is generated based on the output shape data flout, the recording amount of the clear ink is corrected. However, a method of correction is not limited to the above example. For example, after the output height flout (x, y) that the output shape data flout represents is corrected in the same manner as in the above correction, the second recording amount data may be generated based on the output shape data flout that represents the corrected flout (x, y).

<Effects According to Third Embodiment>

As described above, the image-processing apparatus according to the present embodiment calculates the low frequency component of the unevenness to be reproduced and calculates the high frequency component of the unevenness to be reproduced by subtracting the low frequency component from the unevenness to be reproduced. Accordingly, the consumption of the recording material that is used to form the unevenness on the recording medium can be reduced in a different manner from that according to the first embodiment.

[Modification]

In the method described according to the first embodiment, the ink consumption is reduced by reproducing each edge of the unevenness on the recording medium and by making reproduction with the height of the unevenness less than the threshold or the height of the unevenness that has high density being reduced. Whether the process of reproducing the edge of the unevenness, the process of reducing the height by using the threshold, and the process of reducing the height depending on the density are performed may be determined based on a user instruction, and the processes may be switched based on the determination. For example, in the case when it is instructed that none of the above processes for reducing the ink consumption is not performed, the unevenness to be reproduced can be outputted as accurately as possible. The determination of whether the processes are performed as above enables the reduction in the ink consumption to be controlled stepwise. The function, the coefficient, or the shape of the filter for the processes may be parameterized, and parameters may be changed based on a user instruction related to the degree of reduction in the ink consumption. For example, in the case when the threshold th2 at S404 is parameterized, if the threshold th2 is decreased, the frequency of determination that the density is high increases, and the amount of reduction in the ink consumption is increased. If not, if the threshold th2 is increased, the determination that the density is high is unlikely to be made, and the amount of reduction in the ink consumption is reduced. The reduction in the ink consumption can be thus controlled stepwise by changing the parameters depending on the degree of reduction in the ink consumption that is specified by the user. In addition to the threshold th2 at S404, the size or shape of the filter $F_{mov}$, the threshold th at S403, gamma1 at S405, and gamma0 at S406, for example, can be used as the parameters. The coefficient k and gamma2 according to the third embodiment can also be used as the parameters.

Figure 10:
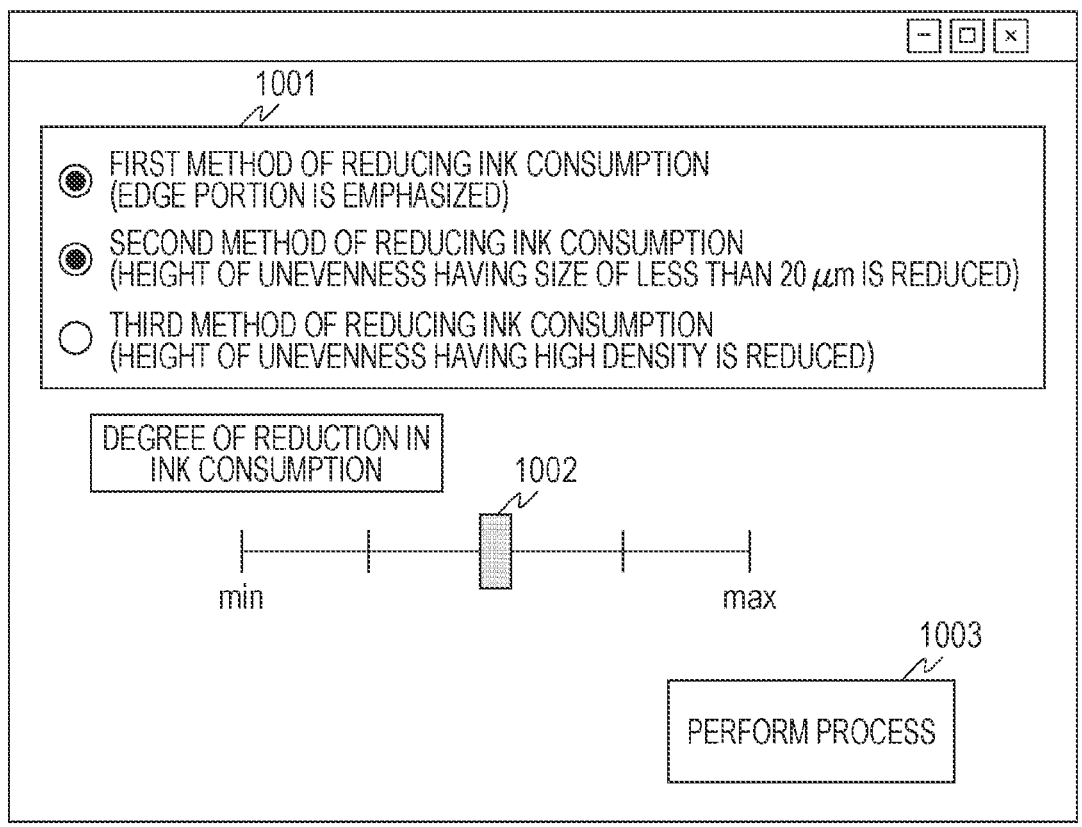
FIG. 10 illustrates an example of a user input (UI).

FIG. 10 illustrates an example of a UI for receiving the user instruction. In a region 1001, the user instructs whether the process of reproducing the edge of the unevenness, the process of reducing the height by using the threshold, and the process of reducing the height depending on the density are performed. The user can specify the degree of reduction in the ink consumption by sliding a slide bar 1002. When the user presses a process performing button 1003, a process that is determined depending on information that is specified in the region 1001 and the slide bar 1002 is started.

According to the first embodiment, the second dot arrangement data that represents the dot arrangement of the clear ink on the recording medium is generated and outputted to the image-forming apparatus 211. However, data that represents the dot arrangement of the ink on the recording medium for every recording scanning may be outputted. Specifically, the number of times the scanning needs to be performed for recording is calculated based on the amount of the ink depending on the pixel that satisfies Flg (x, y)=1, and the number of times the scanning needs to be performed for recording is calculated also based on the amount of the ink depending on the pixel that satisfies Flg (x, y)=0. The number of times of the scanning is set to a larger value of the calculated two numbers of times of the scanning, and the dot arrangement data for every recording scanning is generated based on the set number of times of the scanning.

In some cases, when the unevenness is formed, ink droplets are discharged to the recording medium at coordinates near to each other. In this case, if time intervals at which the ink droplets are discharged are short, before the solvent of an ink droplet that is discharged earlier is soaked by the recording medium, a subsequent ink droplet is discharged, and the ink droplets cling to each other due to surface tension (beading) in some cases. Regarding the unevenness relative to the pixel that satisfies Flg (x, y)=1, the unevenness does not have a high density, and the beading occurs in a direction of an edge. Accordingly, the beading does not cause a big problem in many cases. Regarding the unevenness relative to the pixel that satisfies Flg (x, y)=0, however, the unevenness is fine and has high density, and the occurrence of the beading changes the texture of the unevenness. In view of this, the halftone process may be performed on a region of Flg (x, y)=0 by using a dot arrangement pattern that has high dispersiveness to inhibit beading from occurring. The number of times of the recording scanning may be increased such that continuous recording scanning does not arrange dots at coordinates near to each other. As the number of times of the recording scanning increases, the time required for recording increases. Accordingly, the number of times of the recording scanning is preferably decreased as much as possible. Regarding the pixel that satisfies Flg (x, y)=1, the occurrence of beading may not be considered, and the number of times of the scanning may be determined based on a ratio between the maximum amount of the ink that is applied to the same pixel and the amount of the ink that can be applied when the scanning is performed once. Thus, the number of times of the recording scanning that is needed for two kinds of regions having different characteristics is calculated, and a larger value is determined to be the number of times of the recording scanning. Consequently, the texture of the uneven surface is represented, and the print on which the user recognizes the reproduced unevenness can be formed.

According to the first embodiment, the ink consumption is reduced by reproducing each edge of the unevenness on the recording medium and by making reproduction with the height of the unevenness less than the threshold or the height of the unevenness that has high density being reduced. In addition to this, according to the second embodiment, the ink consumption is reduced by reproducing the unevenness that has a height less than the threshold or the unevenness that has high density by using the gloss control ink. The ink consumption may be reduced by performing at least one of these methods.

According to the above embodiments, the ink-jet printer that uses the aqueous ink is used as the image-forming apparatus 211. However, the image-forming apparatus 211 is not limited to the above example. For example, a printer that includes an UV radiation unit for hardening the ink by radiating ultraviolet (UV) to the ink that is discharged on the recording medium may be used. In this case, the clear ink that is used to form the unevenness is UV ink that is hardened by UV radiation. Provided that the unevenness can be formed on the recording medium, the recording method of the printer is not limited to an ink-jet recording method but may be an electrophotographic method.

According to the second embodiment, the gloss data is acquired, and the glossy layer is formed based on the acquired gloss data. However, the gloss data may not be acquired, and the stereoscopic effect may be produced by using the glossy layer. When two regions having different degrees of the gloss are adjacent to each other, human beings can recognize the two regions as different regions. Accordingly, the stereoscopic effect can be produced with a small recording amount of the ink by making a difference in the gloss between an edge region and a non-edge region. For example, at S406', the gloss data is not acquired, and the output gloss data G is generated by using the following expression (11).

$$G(x,y)=k\times(H(x,y)-E(x,y)) \qquad \text{expression (11)}$$

In expression (11), a difference between the height H (x, y) of the unevenness and the height E (x, y) of the edge is converted into the output gloss data G.

According to the above embodiments, after the determination at S403 is made, the determination at S404 is made. However, the order of the determination may be changed. That is, after the flag data is generated by making the determination of the density of the edge, the flag data may be updated by making the determination of the height of the edge.

According to the above embodiments, the shape data represents the height of the unevenness but may be another data such as data that represents a normal to the surface of the unevenness, provided that the shape data represents the shape of an object.

According to the above embodiments, typical filtering processes are performed to detect the edge at S402 and to determine the density at S404. However, the filters that are used for these processes may be united by, for example, convolution.

According to the above embodiments, the threshold that is used for the determination at S403 is 20 μm. However, the threshold may be changed depending on the kind of the recording medium or the recording amount of the ink that is used for the image layer or the glossy layer.

According to the above embodiments, the density of the edge of the uneven layer is determined at S404. However, the density may be determined also in consideration of the degree of diffusion of the ink (dot arrangement) that is applied when the image layer or the glossy layer is formed.

According to the above embodiments, the image-processing apparatus 1 is connected to the image-forming apparatus 211 with the serial bus 209 interposed therebetween. However, the image-forming apparatus 211 may include the image-processing apparatus 1.

According to the above embodiments, the color data that represents the color of the image layer is acquired. However, the color data may not be acquired, and the first recording amount data or the first dot arrangement data of the color ink may be acquired and outputted to the image-forming apparatus 211 as it is. Also, regarding the gloss data, the third recording amount data or the third dot arrangement data may be acquired and outputted to the image-forming apparatus 211 as it is.

According to the above embodiments, the shaped article that includes the image layer and the uneven layer is formed. However, the structure of the shaped article is not limited to the above example, provided that at least the uneven layer is included. For example, only the uneven layer may be formed as the shaped article.

According to the above embodiments, the ink is used as the recording material. However, another recording material such as toner may be used.

According to an embodiment of the present invention, the consumption of a recording material that is used to form unevenness on a recording medium can be reduced.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus for generating data, the apparatus comprising:
one or more processors and one or more memories, the one or more memories comprising one or more programs, wherein the one or more programs cause the one or more processors:
(a) to generate edge data for specifying an area that corresponds to an edge of a convex portion in unevenness;
(b) to set, based on a user instruction, a process for reducing a recording amount of a recording material for forming the area on a recording medium from a plurality of processes including a first process and a second process;
(c) to reduce, in a case when the first process is set, a recording amount of the recording material for forming, on the recording medium, an area that corresponds to the edge the height of which is less than a first threshold; and
(d) to reduce, in a case when the second process is set, a recording amount of the recording material for forming, on the recording medium, an area that corresponds to the edge, the density of which is less than a second threshold.

2. The apparatus according to claim 1, wherein the one or more programs cause the one or more processors:
to determine whether a density of the edge that the edge data represents is equal to or greater than the second threshold; and
to reduce the recording amount of the recording material for forming, on the recording medium, the area that corresponds to the edge the density of which is less than the second threshold.

3. The according to claim 1, wherein the one or more programs cause the one or more processors to generate the edge data by using a differential filter.

4. The apparatus according to claim 2, wherein the one or more programs cause the one or more processors to calculate the density of the edges in the edge data by using a low pass filter.

5. The apparatus according to claim 1, wherein the one or more programs cause the one or more processors:
to determine whether edges in the edge data need conversion into unevenness for controlling a gloss characteristic;
to convert, into gloss data that represents the gloss characteristic, a height of the edge determined to need the conversion into the unevenness for controlling the gloss characteristic among the edges; and to generate data to form a glossy layer on at least a portion of the edge in the edge data that is formed on the recording medium, based on the gloss data.

6. The apparatus according to claim 1, wherein the first threshold is 20 μm.

7. The apparatus according to claim 1, wherein the recording material is a clear ink.

8. The apparatus according to claim 1, wherein the recording material is an aqueous ink including a solid.

9. The apparatus according to claim 1, wherein the one or more programs cause the one or more processors:
to calculate a low frequency component of the unevenness; and
to generate the edge data by subtracting a height of the low frequency component from a height of the unevenness.

10. The apparatus according to claim 1, wherein the one or more programs further cause the one or more processors to generate recording amount data representing the recording amount of the recording material for forming, on the recording medium, the area that corresponds to the edge, the height of which is less than the first threshold.

11. The apparatus according to claim 1, wherein the area that corresponds to the edge, the height of which is less than the first threshold, is formed on the recording medium by an inkjet printer.

12. The apparatus according to claim 1, wherein the one or more programs cause the one or more processors to reduce the number of times a recording head scans for forming the area that corresponds to the edge, the height of which is less than the first threshold.

13. The apparatus according to claim 1, wherein the one or more programs cause the one or more processors to control, based on color information, forming a color image on the area that corresponds to the edge, the height of which is less than the first threshold.

14. The apparatus according to claim 1, wherein the one or more programs cause the one or more processors to correct the recording amount of the recording material based on an amount of the recoding material that the recording medium can soak.

15. The apparatus according to claim 1, wherein the one or more programs cause the one or more processors to set an amount of reduction of the recording material amount based on a user instruction.

16. The apparatus according to claim 1, wherein the one or more programs cause the one or more processors to set the first threshold based on a kind of the recording medium.

17. The apparatus according to claim 1, wherein the recording material is ink that is hardened by ultraviolet ray radiation.

18. The apparatus according to claim 1, wherein the one or more programs cause the one or more processors to set the first threshold and the second threshold based on a user instruction regarding an amount of reduction of the recording material amount.

19. The apparatus according to claim 1, wherein the one or more programs cause the one or more processors:
to determine whether a height of the edge that the edge data represents is equal to or greater than the first threshold; and
to reduce the recording amount of the recording material for forming, on the recording medium, the area that corresponds to the edge, the height of which is less than the first threshold and not to reduce a recording amount of the recording material for forming, on the recording medium, an area that corresponds to the edge, the height of which is equal to or greater than the first threshold.

20. A method of generating data, the method comprising:
generating edge data for specifying an area that corresponds to an edge of a convex portion in unevenness;
setting, based on a user instruction, a process for reducing a recording amount of a recording material for forming the area on a recording medium from a plurality of processes including a first process and a second process;
reducing, in a case when the first process is set, a recording amount of a recording material for forming, on the recording medium, an area that corresponds to the edge, the height of which is less than a first threshold; and
reducing, in a case when the second process is set, a recording amount of a recording material for forming, on the recording medium, an area that corresponds to the edge, the density of which is less than a second threshold.

21. A non-transitory computer readable storage medium storing a computer program for causing a computer to execute a method, the method comprising:
generating edge data for specifying an area that corresponds to an edge of a convex portion in unevenness;
setting, based on a user instruction, a process for reducing a recording amount of a recording material for forming the area on a recording medium from a plurality of processes including a first process and a second process;
reducing, in a case when the first process is set, a recording amount of a recording material for forming, on the recording medium, an area that corresponds to the edge, the height of which is less than a first threshold; and
reducing, in a case when the second process is set, a recording amount of a recording material for forming, on the recording medium, an area that corresponds to the edge, the density of which is less than a second threshold.

* * * * *